(12) United States Patent
Deeba et al.

(10) Patent No.: US 7,922,988 B2
(45) Date of Patent: Apr. 12, 2011

(54) MULTILAYERED CATALYST COMPOSITIONS

(76) Inventors: Michel Deeba, East Brunswick, NJ (US); Stephan Siemund, Pattensen (DE); Xinyi Wei, Princeton, NJ (US); Stefan Kotrel, Bedminster, NJ (US); Knut Wassermann, Princeton, NJ (US); Glenn Svoboda, Branchburg, NJ (US); Harold Rabinowitz, Montclair, NJ (US)

( * ) Notice: Subject to any disclaimer, the term of this patent is extended or adjusted under 35 U.S.C. 154(b) by 0 days.

(21) Appl. No.: 12/609,622

(22) Filed: Oct. 30, 2009

(65) Prior Publication Data

US 2010/0104491 A1 Apr. 29, 2010

Related U.S. Application Data

(63) Continuation-in-part of application No. 11/836,397, filed on Aug. 9, 2007, now Pat. No. 7,622,096.

(51) Int. Cl.
*B01D 53/56* (2006.01)
*B01D 53/62* (2006.01)
*B01D 53/72* (2006.01)
*B01D 53/86* (2006.01)
*B01D 53/94* (2006.01)

(52) U.S. Cl. .............. 423/213.2; 423/213.5; 423/213.7; 423/239.1; 423/245.3; 423/247; 502/527.12; 502/527.13; 422/168; 422/169; 422/170; 422/171; 422/177; 422/180; 422/181; 60/274; 60/282; 60/299; 60/302

(58) Field of Classification Search .............. 502/527.12, 502/527.13; 423/213.2, 213.5, 213.7, 239.1, 423/245.3, 247; 422/168–171, 177, 180, 422/181; 60/274, 282, 299, 302
See application file for complete search history.

(56) References Cited

U.S. PATENT DOCUMENTS

| 4,171,288 | A | 10/1979 | Keith et al. |
| 4,708,946 | A | 11/1987 | Ohata et al. |
| 4,714,694 | A | 12/1987 | Wan et al. |
| 4,727,052 | A | 2/1988 | Wan et al. |

(Continued)

FOREIGN PATENT DOCUMENTS

DE 102005038547 A1 2/2007

(Continued)

OTHER PUBLICATIONS

PCT International Search Report for PCT/US2008/072192, (Nov. 20, 2008), 4 pgs.

(Continued)

*Primary Examiner* — Timothy C Vanoy
(74) *Attorney, Agent, or Firm* — Karen M. Whitney; Diehl Servilla LLC; Melanie L. Brown

(57) ABSTRACT

A layered three-way conversion catalyst having the capability of simultaneously catalyzing the oxidation of hydrocarbons and carbon monoxide and the reduction of nitrogen oxides is disclosed. Engine exhaust treatment system and methods of using the same are also provided. The catalytic material can be provided in layers such that a larger amount of oxygen storage component is provided in a downstream zone as compared to an upstream zone. For example, the upstream zone can be configured to have one, two, or three layers, and the downstream zone can be independently configured to have one, two, or three layers. In one or more embodiments, the catalyst supported on a carrier has three layers, where at least two of the layers are zoned to have an oxygen storage component being present in an upstream zone in an amount that is less than the oxygen storage component present in the downstream zone.

15 Claims, 8 Drawing Sheets

U.S. PATENT DOCUMENTS

| | | | |
|---|---|---|---|
| 4,923,842 A | 5/1990 | Summers | |
| 5,057,483 A | 10/1991 | Wan | |
| 5,128,306 A | 7/1992 | Dettling et al. | |
| 5,254,519 A | 10/1993 | Wan et al. | |
| 5,407,880 A | 4/1995 | Ikeda et al. | |
| 5,597,771 A | 1/1997 | Hu et al. | |
| 5,898,014 A | 4/1999 | Wu et al. | |
| 5,948,377 A | 9/1999 | Sung | |
| 5,948,723 A | 9/1999 | Sung | |
| 5,981,427 A | 11/1999 | Sung et al. | |
| 5,989,507 A | 11/1999 | Sung | |
| 6,087,298 A | 7/2000 | Sung et al. | |
| 6,110,862 A | 8/2000 | Chen et al. | |
| 6,248,688 B1 | 6/2001 | Wu et al. | |
| 6,335,305 B1 | 1/2002 | Suzuki et al. | |
| 6,375,910 B1 | 4/2002 | Deeba et al. | |
| 6,478,874 B1 | 11/2002 | Rosynsky et al. | |
| 6,492,297 B1 | 12/2002 | Sung | |
| 6,497,851 B1 | 12/2002 | Hu et al. | |
| 6,524,992 B2 | 2/2003 | Mussmann et al. | |
| 6,569,392 B1 | 5/2003 | Li et al. | |
| 6,625,976 B1 | 9/2003 | Anderson et al. | |
| 6,680,036 B1 | 1/2004 | Fisher et al. | |
| 6,692,712 B1 | 2/2004 | Anderson | |
| 6,764,665 B2 | 7/2004 | Deeba et al. | |
| 6,777,370 B2 | 8/2004 | Chen | |
| 6,923,945 B2 | 8/2005 | Chen | |
| 7,022,646 B2 | 4/2006 | Li | |
| 7,189,376 B2 | 3/2007 | Kumar et al. | |
| 7,622,096 B2 * | 11/2009 | Deeba et al. | 423/213.2 |
| 2001/0036432 A1 | 11/2001 | Hu et al. | |
| 2003/0061860 A1 | 4/2003 | Hu et al. | |
| 2003/0175192 A1 | 9/2003 | Hu et al. | |
| 2004/0186016 A1 | 9/2004 | Bog et al. | |
| 2004/0223897 A1 | 11/2004 | Yeo | |
| 2005/0164879 A1 | 7/2005 | Chen | |
| 2005/0227867 A1 | 10/2005 | Chen et al. | |
| 2005/0282701 A1 | 12/2005 | Foong et al. | |
| 2006/0052243 A1 | 3/2006 | Muhammed et al. | |
| 2006/0217263 A1 | 9/2006 | Kawamoto et al. | |
| 2007/0014705 A1 | 1/2007 | Chen | |
| 2007/0093382 A1 | 4/2007 | Vanderspurt | |
| 2007/0099298 A1 | 5/2007 | Suzuki | |
| 2008/0044330 A1 | 2/2008 | Chen et al. | |
| 2008/0219906 A1 | 9/2008 | Chen et al. | |

FOREIGN PATENT DOCUMENTS

| | | |
|---|---|---|
| EP | 0665047 A1 | 8/1995 |
| WO | WO 95/35152 A1 * | 12/1995 |
| WO | WO-03/035256 A3 | 5/2003 |
| WO | WO-2007/015387 A1 | 2/2007 |

OTHER PUBLICATIONS

Non-Final Office Action in U.S. Appl. No. 11/836,397, (Feb. 27, 2009), 8 pgs.

* cited by examiner

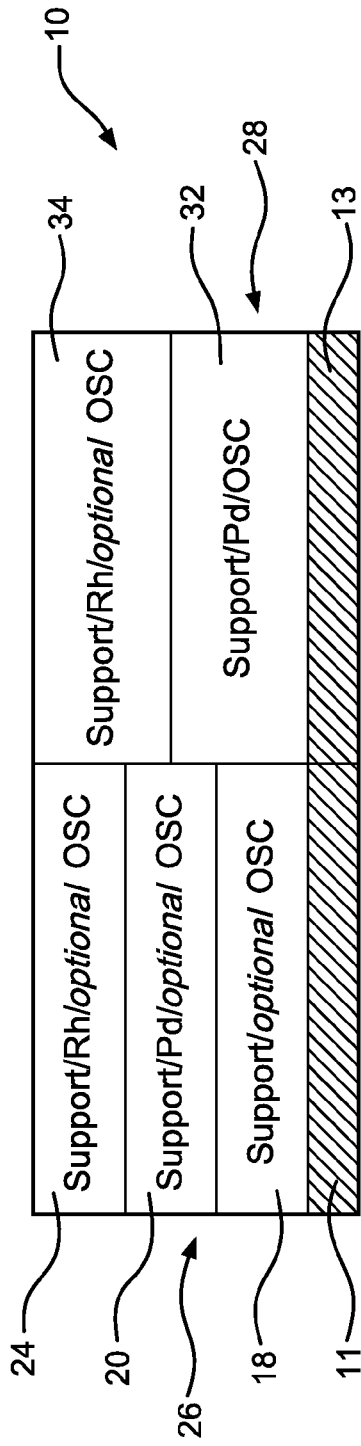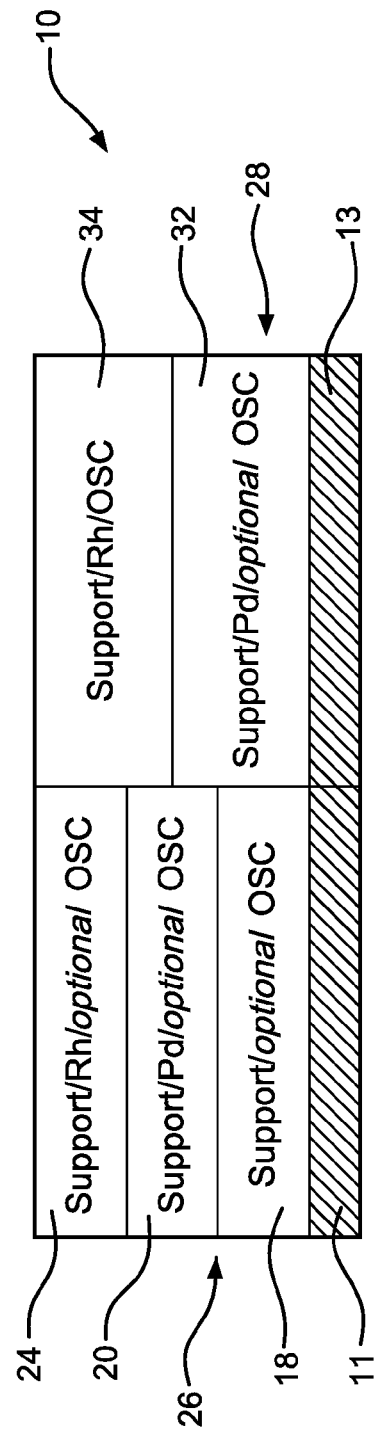

MULTILAYERED CATALYST COMPOSITIONS

CROSS REFERENCE TO RELATED APPLICATION

This application is a continuation-in-part of U.S. patent application Ser. No. 11/836,397, filed Aug. 9, 2007, now U.S. Pat. No. 7,622,096 B2 which is hereby incorporated by reference in its entirety.

TECHNICAL FIELD

This invention pertains generally to layered catalysts used to treat gaseous steams containing hydrocarbons, carbon monoxide, and oxides of nitrogen. More specifically, this invention is directed to three-way catalysts (TWC) having multiple layers, for example, three or more layers of catalytic material.

BACKGROUND

Catalytic converters are well known for the removal and/or conversion of the harmful components of exhaust gases. They typically contain a three-way conversion (TWC) catalyst and are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. U.S. Pat. Nos. 5,057,483; 5,597,771; 7,022,646; and WO95/35152 disclose TWC catalysts having two layers with precious metals. U.S. Pat. No. 6,764,665 discloses a TWC catalyst having three layers, including a palladium layer having substantially no oxygen storage components.

The high surface area alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al., U.S. Pat. No. 4,171,288, the entire content of which is incorporated herein by reference.

Bulk cerium oxide (ceria) is known to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694, naming C. Z. Wan et al. as inventors and incorporated herein by reference, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. Nos. 4,727,052 and 4,708,946, each incorporated herein by reference.

Multilayered catalysts are widely used in TWC. It is a continuing goal to develop three-way conversion catalyst systems that have the ability to oxidize hydrocarbons and carbon monoxide while reducing nitrogen oxides to nitrogen. There is also a goal to utilize components of TWC catalysts, especially the precious metals, as efficiently as possible. Further, there is an ongoing need to develop three-way catalysts that are effective during cold start and rich transient conditions.

SUMMARY

The present invention relates to a layered catalyst composite and systems of composites of the type generally referred to as a three-way conversion catalyst having the capability of simultaneously catalyzing the oxidation of hydrocarbons and carbon monoxide and the reduction of nitrogen oxides. In a first aspect, an exhaust gas treatment system comprises: a catalytic material deposited on a carrier, the carrier comprising a longitudinal axis, an upstream end, a downstream end, having a length extending between the inlet end to the outlet end.

The catalytic material is designed to provide a larger amount of oxygen storage component in a downstream zone as compared to an upstream zone. The catalytic material can be provided in layers. For example, the upstream zone can be configured to have one, two, or three layers, and the downstream zone can be independently configured to have one, two, or three layers. In one embodiment, the both the upstream and downstream zone have two layers. In another embodiment, the upstream zone has three layers and the downstream zone has two layers. A further embodiment provides that the upstream zone has two layers and the downstream zone has three layers. In yet another embodiment, both the upstream and downstream zone have three layers. The upstream zone can be located on the same substrate as the downstream zone. Alternatively, should it be desired to use different substrates, a first substrate can provide an upstream zone when it is located upstream of a second substrate that then provides a downstream zone.

In a detailed embodiment, the catalytic material comprises: an inner layer having an inner layer upstream zone and an inner layer downstream zone deposited on the carrier, the inner layer comprising a first support, being substantially free of precious metals, and, optionally, comprising a first oxygen storage component; a middle layer having a middle layer upstream zone and a middle layer downstream zone, the middle layer comprising a second support, a palladium component, and, optionally, a second oxygen storage component; and an outer layer having an outer layer upstream zone and an outer layer downstream zone, the outer layer comprising a third support, a rhodium component, and, optionally, a third oxygen storage component. In this aspect, at least two the downstream zones contain the respective oxygen storage component in an amount that is greater than in the corresponding upstream zones. That is, at least two of the first oxygen storage component, the second oxygen storage component, and the third oxygen storage component are present in the inner layer downstream zone, the middle layer downstream zone, and the outer layer downstream zone, respectively, in amounts greater than in the inner layer upstream zone, the middle layer upstream zone, and the outer layer upstream zone, respectively.

A specific embodiment provides that the middle layer upstream zone comprises a palladium component in an amount in the range of 50-90 (in other embodiments, 60-85, or even 70-80) % by weight of the zone and the middle layer downstream zone comprises the palladium component in an amount in the range of 10-50 (in other embodiments, 15-40, or even 20-30) % by weight of the zone.

Another specific embodiment provides that the outer layer upstream zone comprises a rhodium component in an amount in the range of 50-80 (in other embodiments, 60-75, or even 65-70) % by weight of the zone and the middle layer downstream zone comprises the rhodium component in an amount in the range of 20-50 (in other embodiments, 25-40, or even 30-35) % by weight of the zone. In a further embodiment, the rhodium component of the outer layer is substantially uniformly distributed throughout the layer.

In one embodiment, the inner layer upstream zone is substantially free of an oxygen storage component and the inner layer downstream zone comprises the first oxygen storage component in an amount in the range of 10 to 50% by weight in the zone. In another embodiment, wherein the first oxygen storage component is present in the inner layer upstream zone in an amount in the range of 0.1 to 20% by weight in the zone and in the inner layer downstream zone in an amount in the range of 10 to 50% by weight in the zone.

A further embodiment provides that the middle layer upstream zone is substantially free of an oxygen storage component and the middle layer downstream zone comprises the second oxygen storage component in an amount in the range of 10 to 25% by weight in the zone. On the other hand, another embodiment provides that the second oxygen storage component is present in the middle layer upstream zone in an amount in the range of 0.1 to 20% by weight in the zone and in the middle layer downstream zone in an amount in the range of 10 to 25% by weight in the zone.

In another embodiment, both the inner layer upstream zone and the outer layer downstream zone are substantially free of an oxygen storage component. In a detailed embodiment, the outer layer upstream zone comprises the third oxygen storage component in an amount in the range of 0.1 to 20% by weight in the zone.

Provided in another embodiment is the inner layer upstream zone being substantially free of an oxygen storage component; the middle layer upstream zone comprising the second oxygen storage component in an amount in the range of 0 to 25% by weight of the layer; and the outer layer upstream zone comprising the third oxygen storage component in an amount in the range of 0 to 20% by weight in the zone. Alternatively, another embodiment provides that the inner layer upstream zone comprises the first oxygen storage component in an amount in the range of 0.1 to 20% by weight in the zone; the middle layer upstream zone comprises the second oxygen storage component in an amount in the range of 0 to 25% by weight of the layer; and the outer layer upstream zone comprises the third oxygen storage component in an amount in the range of 0 to 20% by weight in the zone.

In detailed embodiment, the inner layer downstream zone comprises the first oxygen storage component in an amount in the range of 10 to 50% by weight of the layer; the middle layer downstream zone comprises the second oxygen storage component in an amount in the range of 10 to 25% by weight of the layer; and the outer layer downstream zone comprises the third oxygen storage component in an amount in the range of 0 to 20% by weight in the zone.

In one or more embodiments, the inner layer upstream zone, the middle layer upstream zone, the outer layer upstream zone, or combinations thereof begins from the upstream end and extends for no more than 50% of the substrate's length.

In one or more other embodiments provides that the inner layer downstream zone, the middle layer downstream zone, or combinations thereof begins from the downstream end and extends for no more than 50% of the substrate's length.

In a further embodiment, the first support of the inner layer comprises alumina in an amount in the range of 20 to 90% by weight of the layer; the first oxygen storage component comprises ceria; and the inner layer downstream zone comprises the first oxygen storage component in an amount in the range of 10 to 50% by weight of the zone; the second support of the middle layer comprises alumina in an amount in the range of 20 to 70% by weight of the layer and palladium in an amount of 2% or less by weight of the layer; the second oxygen storage component comprises ceria; and the middle layer downstream zone comprises the second oxygen storage component in an amount in the range of 0.1 to 25% by weight of the zone; and the third support of the outer layer comprises alumina in an amount in the range of 50 to 80% by weight of the layer and rhodium in an amount of 0.5% or less by weight of the layer; the third oxygen storage component comprises ceria; and the outer layer downstream zone comprises the third oxygen storage component in an amount in the range of 0.1 to 20% by weight of the zone.

Another embodiment provides that the inner layer, the middle layer, the outer layer, or combinations thereof further independently comprise platinum, palladium, rhodium, or combinations thereof.

One or more other embodiments provide that the inner layer, the middle layer, the outer layer, or combinations thereof are independently supported by an activated compound selected from the group consisting of alumina, silica-alumina, alumino-silicates, alumina-zirconia, and alumina-ceria.

In one embodiment, the outer layer upstream zone and the outer layer downstream zone have the same composition. Another embodiment provides that the middle layer upstream zone and the middle layer downstream zone have the same composition. A further embodiment provides that the inner layer upstream zone and the inner layer downstream zone have the same composition.

Another aspect provides a method for oxidizing hydrocarbons, carbon monoxide, and reducing nitrogen oxides, the method comprising: contacting a gaseous stream comprising the hydrocarbons, carbon monoxide, and nitrogen oxides with an exhaust gas treatment system. The exhaust gas treatment system comprises a catalytic material deposited on a carrier, the carrier comprising a longitudinal axis, an upstream end, a downstream end, having a length extending between the inlet end to the outlet end. The catalytic material comprises: an inner layer having an inner layer upstream zone and an inner layer downstream zone deposited on the carrier, the inner layer comprising a first support, being substantially free of precious metals, and, optionally, comprising a first oxygen storage component; a middle layer having a middle layer upstream zone and a middle layer downstream zone, the middle layer comprising a second support, a palladium component, and, optionally, a second oxygen storage component; and an outer layer having an outer layer upstream zone and an outer layer downstream zone, the outer layer comprising a third support, a rhodium component, and, optionally, a third oxygen storage component. In this aspect, at least two of the first oxygen storage component, the second oxygen storage component, and the third oxygen storage component are present in the inner layer downstream zone, the middle layer downstream zone, and the outer layer downstream zone, respectively, in amounts greater than in the inner layer upstream zone, the middle layer upstream zone, and the outer layer upstream zone, respectively.

In a further aspect, an exhaust gas treatment system comprises a catalytic material having the capability of simultaneously catalyzing the oxidation of hydrocarbons and carbon monoxide and the reduction of nitrogen oxides and having an upstream zone and a downstream zone deposited on a carrier; wherein in the upstream zone, the catalytic material comprises: an inner layer on the carrier, the inner layer comprising a support and a palladium component; an outer layer above the inner layer, the outer layer comprising a support and a rhodium component; and a first oxygen storage component located in the inner layer, the outer layer, or both; wherein in the downstream zone, the catalytic material comprises: an inner layer on the carrier, the inner layer comprising a support and a palladium component; an outer layer above the inner layer, the outer layer comprising a support and a rhodium component; and a second oxygen storage component located in the inner layer, the outer layer, or both such that the second oxygen storage component is present in an amount that is greater than the amount of the first oxygen storage component.

In a detailed embodiment, the carrier comprises a first substrate the upstream zone and a second substrate such that the upstream zone is located on the first substrate and the downstream zone is located in the second substrate.

Another embodiment provides that the upstream zone further comprises a middle layer located above the inner layer and below the outer layer, the middle layer comprising a support and an optional palladium component and an optional third oxygen storage component. The downstream zone can further comprise a middle layer located above the inner layer and below the outer layer, the middle layer comprising a support and an optional palladium component and an optional third oxygen storage component.

A detailed embodiment provides that the first oxygen storage component is present in an amount in the range of 0.1 to 1.5 g/in$^3$ and the second oxygen storage component is present in an amount in the range of 1.55 to 2.0 g/in$^3$.

In one or more embodiments, the outer layer of both the upstream zone and the downstream zone comprise the same composition. In one or more embodiments, the inner layer of both the upstream zone and the downstream zone comprise the same composition.

One embodiment provides that both the upstream and downstream zones each further comprises a middle layer located above the inner layer and below the outer layer, the middle layers each independently comprise a support, a palladium component, and a third oxygen storage component. Both the upstream and downstream zones can each further comprise a middle layer located above the inner layer and below the outer layer, the inner layers of both the upstream and downstream zones each comprising the same composition.

BRIEF DESCRIPTION OF DRAWINGS

FIGS. 11-15 depict schematic views of catalytic members having three layers in the upstream zone and two layers in the downstream zone.

DETAILED DESCRIPTION

Figure 1:
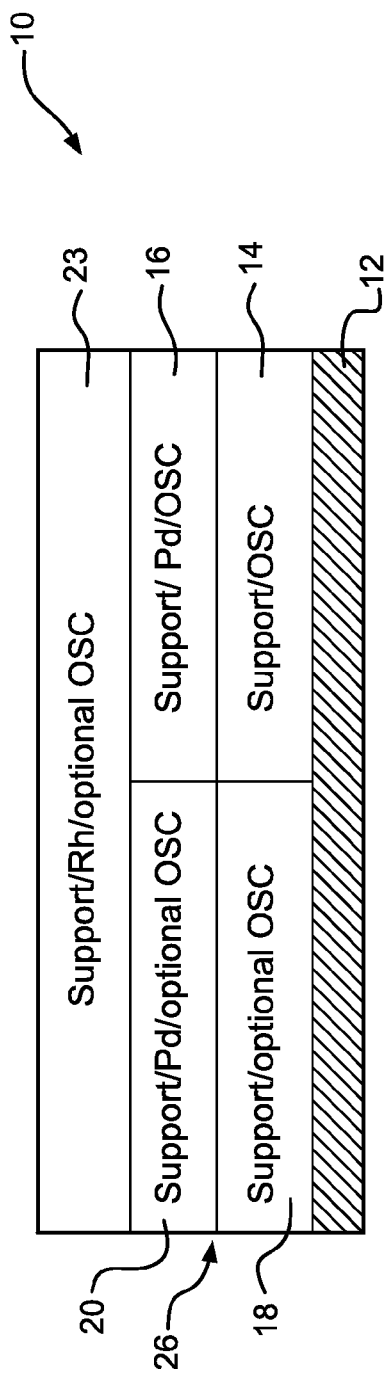
FIG. 1 is a schematic view showing a configuration of layers on a catalytic member.

The present invention relates to a layered catalyst composite and systems of composites of the type generally referred to as a three-way conversion catalyst having the capability of simultaneously catalyzing the oxidation of hydrocarbons and carbon monoxide and the reduction of nitrogen oxides. It has been found that the use of palladium in conjunction with an oxygen storage component provides synergistic effects for NO$_x$ and hydrocarbon conversion. Moreover, the use of rhodium in the outer layer with the optional use of an oxygen storage component shows excellent performance for NO$_x$ conversion.

In a first aspect, an exhaust gas treatment system comprises: a catalytic material deposited on a carrier, the carrier comprising a longitudinal axis, an upstream end, a downstream end, having a length extending between the inlet end to the outlet end.

The catalytic material comprises: an inner layer having an inner layer upstream zone and an inner layer downstream zone deposited on the carrier, the inner layer comprising a first support, being substantially free of precious metals, and, optionally, comprising a first oxygen storage component; a middle layer having a middle layer upstream zone and a middle layer downstream zone, the middle layer comprising a second support, a palladium component, and, optionally, a second oxygen storage component; and an outer layer having an outer layer upstream zone and an outer layer downstream zone, the outer layer comprising a third support, a rhodium component, and, optionally, a third oxygen storage component. In this aspect, at least two the downstream zones contain the respective oxygen storage component in an amount that is greater than in the corresponding upstream zones. That is, at least two of the first oxygen storage component, the second oxygen storage component, and the third oxygen storage component are present in the inner layer downstream zone, the middle layer downstream zone, and the outer layer downstream zone, respectively, in amounts greater than in the inner layer upstream zone, the middle layer upstream zone, and the outer layer upstream zone, respectively.

Reference to "substantially free of precious metal components" means that precious metals may be present at a level of less than or equal to approximately 100 ppm, but the presence of the precious metals does not significantly increase the cost of the catalyst materials. Reference to oxygen storage component (OSC) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

The catalytic composites may be more readily appreciated by reference to the Figures, which are merely exemplary in nature and in no way intended to limit the invention or its application or uses. Referring in particular to FIG. 1, a configuration of the catalytic member 10 of an exhaust gas treatment system is shown in accordance with one embodiment of the present invention. The catalytic member 10 comprises a substrate 12, typically a honeycomb monolith substrate, which is coated with inner washcoat zones 14 and 18, middle washcoat zones 20 and 16, and an outer washcoat layer 23.

An inner layer contains an upstream zone 18 and a downstream zone 14. The upstream zone 18 contains a support and, optionally, an oxygen storage component (OSC), and is substantially free of a precious metal component. A downstream zone 14 contains a support and an OSC, and is substantially free of a precious metal component. A middle washcoat layer comprises an upstream zone 20 and a downstream zone 16. The upstream zone 20 contains a support, a palladium component, and an optional OSC. The downstream zone 16 contains a support, a palladium component, and an OSC. An outer layer 23 contains a support, a rhodium component, and optionally an OSC. The precious metal catalysts and oxygen storage components used in the practice of embodiments of the present invention are discussed in more detail below. The downstream zones 14 and 16 each contain the respective oxygen storage component in an amount greater than that in upstream zones 18 and 20 respectively.

As used herein, the terms "upstream" and "downstream" refer to relative locations on the carrier according to the flow of an engine exhaust gas stream. The gas stream first enters the carrier at the upstream end and exits from the downstream end. In FIG. 1, the inner layer upstream zone 18 and the middle layer upstream zone 20 are located starting at the upstream end 26, and extend only a portion of the length of the carrier 12. The outer layer 23 extends substantially the entire length of the carrier 12. The inner layer downstream zone 14 and the middle layer downstream zone 16 extend from the downstream end 28 for a portion of the carrier 12. In one or more embodiments, the inner layer upstream zone 18 abuts the inner layer downstream zone 14. In other embodiments, the middle layer upstream zone 20 abuts the middle layer downstream zone 16.

Figure 2:
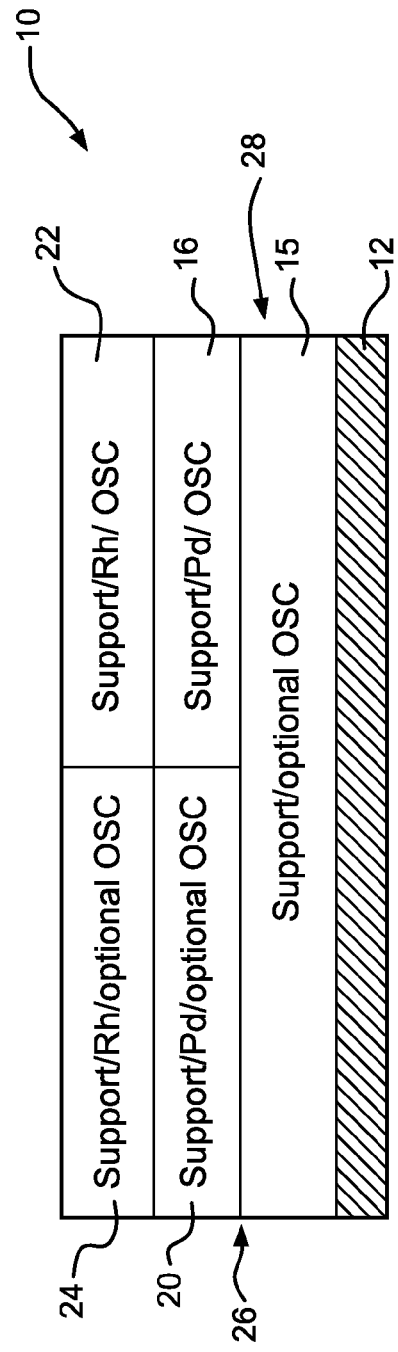
FIG. 2 is a schematic view showing another configuration of layers on a catalytic member.

In FIG. 2, a configuration of the catalytic member 10 of an exhaust gas treatment system is shown. In this embodiment, the catalytic member 10 comprising a substrate 12, typically a honeycomb monolith substrate, is coated with an inner layer 15; a middle layer having an upstream zone 20 and a downstream zone 16, and an outer layer having an upstream zone 24 and a downstream zone 22. The inner layer contains a support, and an optional oxygen storage component (OSC). The upstream zone 20 of the middle layer contains a support, a palladium component and an optional OSC. The middle layer downstream zone 16 contains a support, a palladium component, and an OSC. The outer layer upstream zone 24 contains a support, a rhodium component, and optionally an OSC. The outer layer downstream zone 22 contains a support, a rhodium component, and an OSC.

The middle layer upstream zone 20 and the outer layer upstream zone 24 are located starting at the upstream end 26 and extend a portion of the length of the carrier 12. The middle layer downstream zone 16 and the outer layer downstream zone 22 are located starting at the downstream end 28 and extend a portion of the length of the carrier 12. In one or more embodiments, the middle layer upstream zone 20 abuts the middle layer downstream zone 16. In other embodiment, the outer layer upstream zone 24 abuts the middle layer downstream zone 22.

Figure 3:
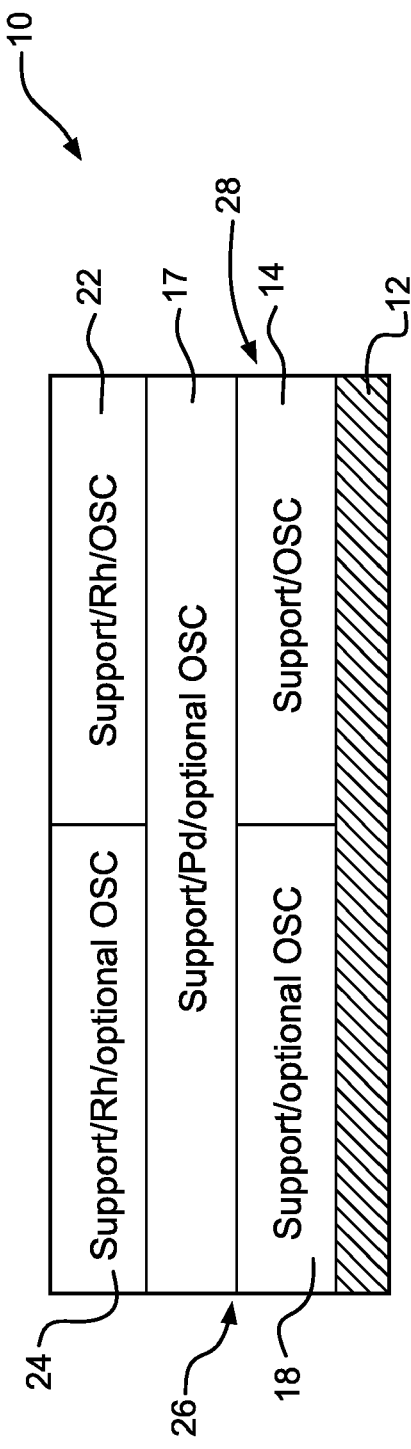
FIG. 3 is a schematic view showing another configuration of layers on a catalytic member.

In FIG. 3, a configuration of the catalytic member 10 of an exhaust gas treatment system is shown. In this embodiment, the catalytic member 10 comprising a substrate 12, typically a honeycomb monolith substrate, is coated with an inner layer having an upstream zone 18 and a downstream zone 14, a middle layer, and an outer layer having an upstream zone 24 and a downstream zone 22. The upstream zone 18 of the inner layer contains a support and an optional oxygen storage component (OSC). The downstream zone 14 contains a support and an OSC. The middle layer contains a support, a palladium component, and an optional OSC. The outer layer upstream zone 24 contains a support, a rhodium component, and optionally an OSC. The outer layer downstream zone 22 contains a support, a rhodium component, and an OSC.

The inner layer upstream zone 18 and the outer layer upstream zone 24 are located starting at the upstream end 26 and extend a portion of the length of the carrier 12. The inner layer downstream zone 14 and the outer layer downstream zone 22 are located starting at the downstream end 28 and extend a portion of the length of the carrier 12. In one or more embodiments, the inner layer upstream zone 18 abuts the inner layer downstream zone 14. In other embodiment, the outer layer upstream zone 24 abuts the middle layer downstream zone 22.

Figure 4:
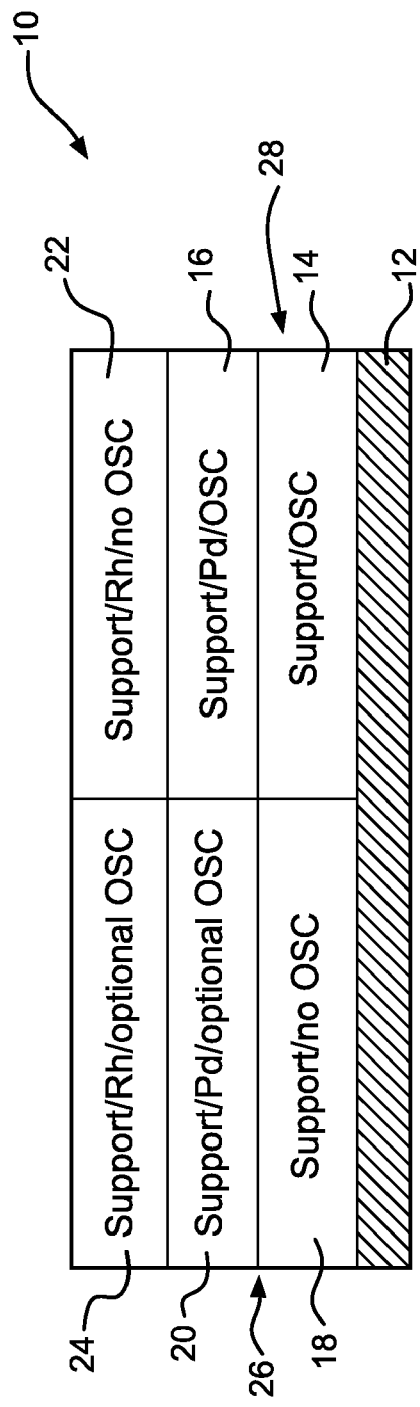
FIG. 4 is a schematic view showing another configuration of layers on a catalytic member.

In FIG. 4, an inner layer has an upstream zone 18 comprising a support and is substantially free of precious metal components and an oxygen storage component (OSC). A middle layer has an upstream zone 20 comprising a support, a palladium component, and an optional OSC. A middle layer downstream zone 16 comprises a support, a palladium component, and an OSC. An outer layer comprises an upstream zone 24 having a support, a rhodium component, and an optional OSC; and a downstream zone 22 having a support, a rhodium component, and is substantially free of an oxygen storage component.

Figure 5:
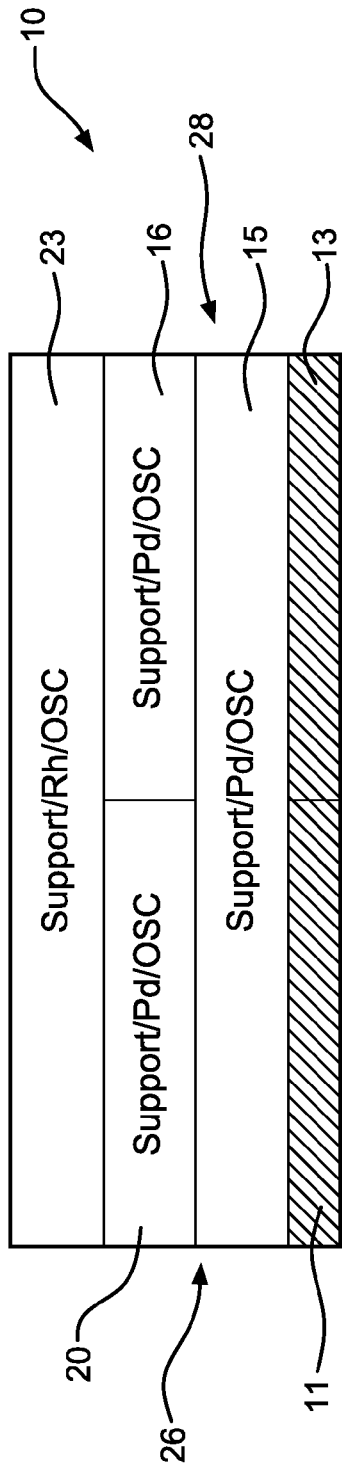
FIGS. 5-6 depict schematic views of catalytic members having other configurations of layers.

In FIG. 5, a configuration of a three-layered catalytic material located on an upstream substrate 11 and a downstream substrate 13 of an exhaust gas treatment system is shown. In this embodiment, both the upstream substrate 11 and the downstream substrate are coated with an inner layer 15 comprising a support, a palladium component, and an oxygen storage component (OSC). A middle layer downstream zone

16 located on the inner layer located on the downstream substrate 13 comprises a support, a palladium component, and an OSC. A middle layer upstream zone 20 located on the inner layer located on the upstream substrate 11 comprises a support, a palladium component, and an OSC in an amount less than that in the middle layer downstream zone. An outer layer 23 comprises a support, a rhodium component, and an OSC.

Figure 6:
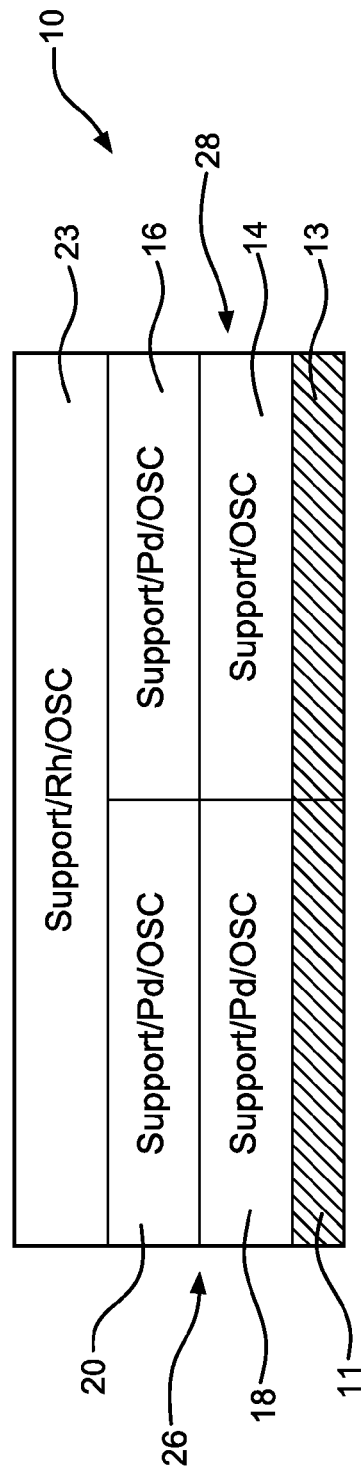

In FIG. 6, a configuration of a three-layered catalytic material located on an upstream substrate 11 and a downstream substrate 13 of an exhaust gas treatment system is shown. In this embodiment, an inner layer upstream zone 18 is located on the upstream substrate, and an inner layer downstream zone 14 is located on the downstream substrate 13. The inner layer upstream zone 18 contains a support, a palladium component, and an oxygen storage component (OSC). The inner layer downstream zone 14 contains a support and an OSC, and is substantially free of a precious metal component. A middle layer downstream zone 16 located on the inner layer downstream zone 14 located on the downstream substrate 13 comprises a support, a palladium component, and an OSC. A middle layer upstream zone 20 located on the inner layer upstream zone 18 located on the upstream substrate 11 comprises a support, a palladium component, and an OSC in an amount less than that in the middle layer downstream zone. An outer layer 23 contains a support, a rhodium component, and an OSC.

Figure 7:
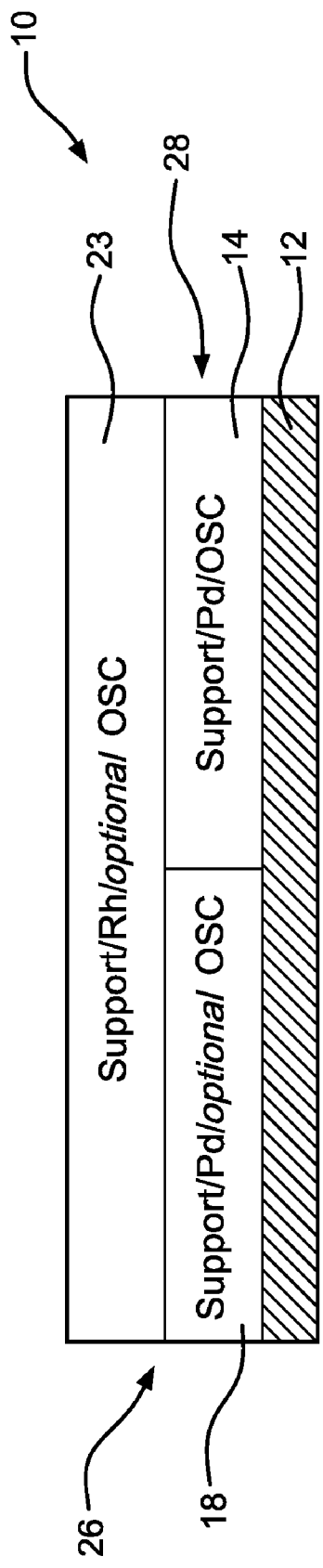
FIGS. 7-10 depict schematic views of catalytic members having two layers in both the upstream and downstream zones.

In FIG. 7, a configuration of a two-layered catalytic member 10 of an exhaust gas treatment system is shown. In this embodiment, the catalytic member 10 comprising a substrate 12, typically a honeycomb monolith substrate, is coated with an inner layer having an upstream zone 18 and a downstream zone 14, and an outer layer 23. The inner layer upstream zone 18 contains a support, palladium, and an optional oxygen storage component (OSC). The inner layer downstream zone 14 contains a support, palladium, and an OSC. The outer layer 23 contains a support, a rhodium component, and optionally an OSC. The amount of OSC in the inner layer downstream zone 14 is more than that in the inner layer upstream zone 18.

The inner layer upstream zone 18 is located starting at the upstream end 26 and extends a portion of the length of the carrier 12. The inner layer downstream zone 14 is located starting at the downstream end 28 and extends a portion of the length of the carrier 12. In one or more embodiments, the inner layer upstream zone 18 abuts the inner layer downstream zone 14.

Figure 8:
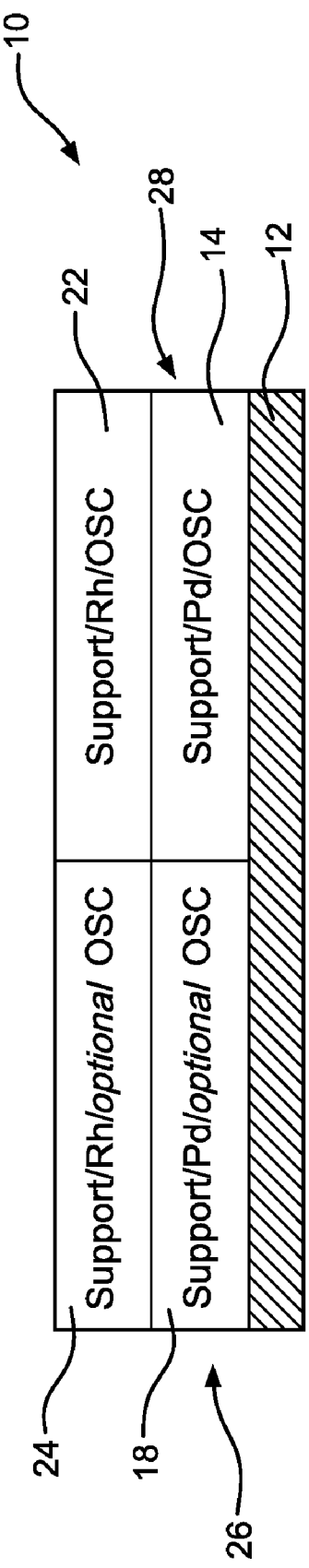

In FIG. 8, a configuration of a two-layered catalytic member 10 of an exhaust gas treatment system is shown. In this embodiment, the catalytic member 10 comprising a substrate 12, typically a honeycomb monolith substrate, is coated with an inner layer having an upstream zone 18 and a downstream zone 14, and an outer layer having an upstream zone 24 and a downstream zone 22. The inner layer upstream zone 18 contains a support, palladium, and an optional oxygen storage component (OSC). The inner layer downstream zone 14 contains a support, palladium, and an OSC. The outer layer upstream zone 24 contains a support, a rhodium component, and optionally an OSC. The outer layer downstream zone 22 contains a support, a rhodium component, and an OSC.

The inner layer upstream zone 18 is located starting at the upstream end 26 and extends a portion of the length of the carrier 12. The inner layer downstream zone 14 is located starting at the downstream end 28 and extends a portion of the length of the carrier 12. In one or more embodiments, the inner layer upstream zone 18 abuts the inner layer downstream zone 14. The outer layer upstream zone 24 is located starting at the upstream end 26 and extends a portion of the length of the carrier 12. The outer layer downstream zone 22 is located starting at the downstream end 28 and extends a portion of the length of the carrier 12. In one or more embodiments, the outer layer upstream zone 24 abuts the outer layer downstream zone 22.

Figure 9:
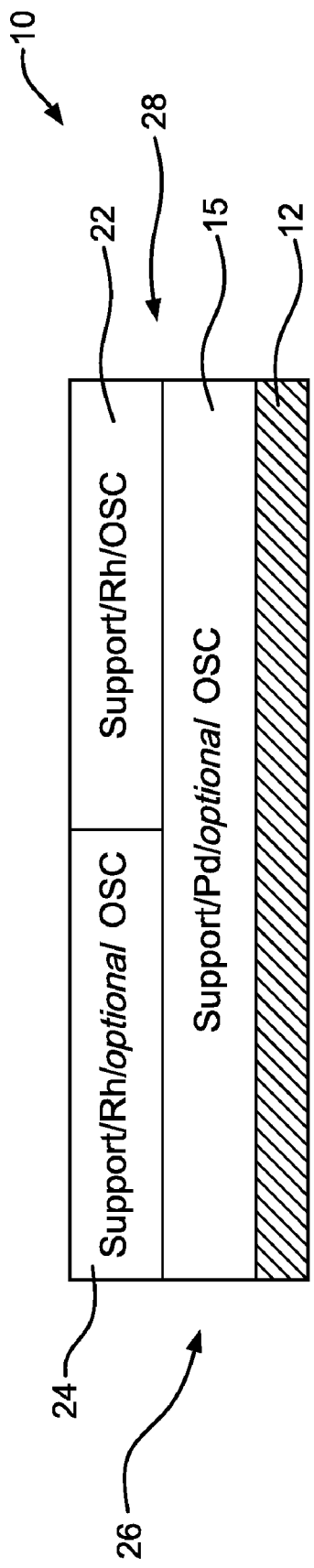

In FIG. 9, a configuration of a two-layered catalytic member 10 of an exhaust gas treatment system is shown. In this embodiment, the catalytic member 10 comprising a substrate 12, typically a honeycomb monolith substrate, is coated with an inner layer 15, and an outer layer having an upstream zone 24 and a downstream zone 22. The inner layer 15 contains a support, palladium, and an optional oxygen storage component (OSC). The outer layer upstream zone 24 contains a support, a rhodium component, and optionally an OSC. The outer layer downstream zone 22 contains a support, a rhodium component, and an OSC.

The inner layer upstream zone 18 is located starting at the upstream end 26 and extends a portion of the length of the carrier 12. The inner layer downstream zone 14 is located starting at the downstream end 28 and extends a portion of the length of the carrier 12. In one or more embodiments, the inner layer upstream zone 18 abuts the inner layer downstream zone 14. The outer layer upstream zone 24 is located starting at the upstream end 26 and extends a portion of the length of the carrier 12. The outer layer downstream zone 22 is located starting at the downstream end 28 and extends a portion of the length of the carrier 12. In one or more embodiments, the outer layer upstream zone 24 abuts the outer layer downstream zone 22.

Figure 10:
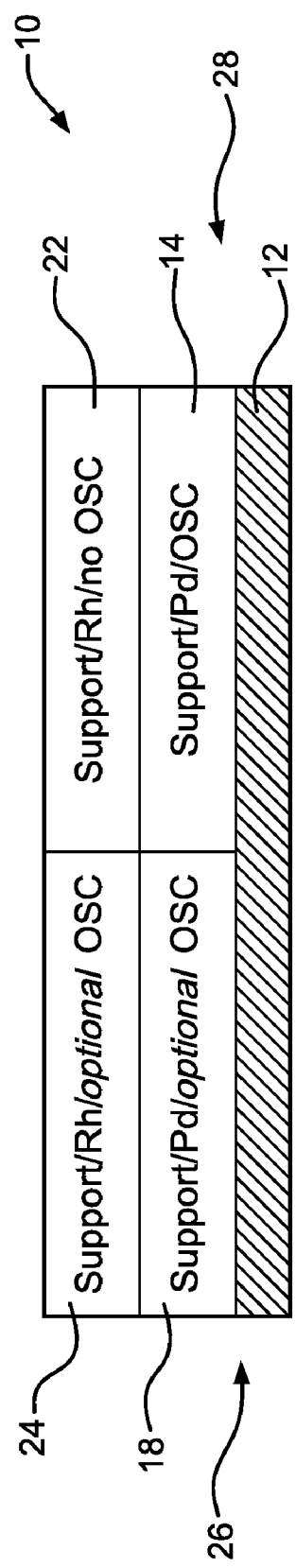

In FIG. 10, a configuration of a two-layered catalytic member 10 of an exhaust gas treatment system is shown. In this embodiment, the catalytic member 10 comprising a substrate 12, typically a honeycomb monolith substrate, is coated with an inner layer having an upstream zone 18 and a downstream zone 14, and an outer layer having an upstream zone 24 and a downstream zone 22. The inner layer upstream zone 18 contains a support, palladium, and an optional oxygen storage component (OSC). The inner layer downstream zone 14 contains a support, palladium, and an OSC. The outer layer upstream zone 24 contains a support, a rhodium component, and optionally an OSC. The outer layer downstream zone 22 contains a support, a rhodium component, and no OSC.

The inner layer upstream zone 18 is located starting at the upstream end 26 and extends a portion of the length of the carrier 12. The inner layer downstream zone 14 is located starting at the downstream end 28 and extends a portion of the length of the carrier 12. In one or more embodiments, the inner layer upstream zone 18 abuts the inner layer downstream zone 14. The outer layer upstream zone 24 is located starting at the upstream end 26 and extends a portion of the length of the carrier 12. The outer layer downstream zone 22 is located starting at the downstream end 28 and extends a portion of the length of the carrier 12. In one or more embodiments, the outer layer upstream zone 24 abuts the outer layer downstream zone 22.

In FIG. 11, a configuration of a catalytic member 10 of an exhaust gas treatment system is shown where an upstream zone having three layers begins at the upstream end 26 and a downstream zone having two layers ends at the downstream end 28, wherein the downstream zone has one or more OSCs in a total amount that is greater than the total amount of OSC(s) in the upstream zone. The zones can abut each other on one or more substrates or can be separated, as desired. In this embodiment, the catalytic member 10 comprises individual substrates 11 and 13, which likewise can be individually housed, or abutted to each other. Alternatively, a single substrate could be used to carry the three layers of the upstream zone and two layers of the downstream zone. Typically the substrates are honeycomb monolith substrates. An inner layer 18 of the upstream zone containing a support and an optional OSC is deposited on the first substrate 11. A middle layer 20 of the upstream zone containing a support, a palladium component, and an optional OSC is deposited on the inner layer 18. An outer layer 24 of the upstream zone containing a support, a rhodium component, and an optional OSC is deposited on the middle layer 20.

An inner layer 32 of the downstream zone containing a support, a palladium component, and an OSC is deposited on the second substrate 13. An outer layer 34 of the downstream zone containing a support, a rhodium component, and an optional OSC is deposited on the inner layer 32. The outer layers of both the upstream and downstream zones can be formed from the same washcoat.

In FIG. 12, a configuration of a catalytic member 10 of an exhaust gas treatment system is shown where an upstream zone having three layers begins at the upstream end 26 and a downstream zone having two layers ends at the downstream end 28, wherein the downstream zone has one or more OSCs in a total amount that is greater than the total amount of OSC(s) in the upstream zone. The zones can abut each other on one or more substrates or can be separated, as desired. In this embodiment, the catalytic member 10 comprises individual substrates 11 and 13, which likewise can be individually housed, or abutted to each other. Alternatively, a single substrate could be used to carry the three layers of the upstream zone and two layers of the downstream zone. Typically the substrates are honeycomb monolith substrates. The upstream zone has an inner layer 18, a middle layer 20, and an outer layer 24 having the compositions provided for in FIG. 11. That is, the inner layer 18 comprises a support and an optional OSC and is deposited on the first substrate 11, the middle layer 20 comprises a support, a palladium component, and an optional OSC and is deposited on the inner layer 18, and the outer layer 24 comprises a support, a rhodium component, and an optional OSC and is deposited on the middle layer 20.

An inner layer 32 of the downstream zone containing a support, a palladium component, and an optional OSC is deposited on the second substrate 13. An outer layer 34 of the downstream zone containing a support, a rhodium component, and an OSC is deposited on the inner layer 32. The inner layers of both the upstream and downstream zones can be formed from the same washcoat.

Figure 13:
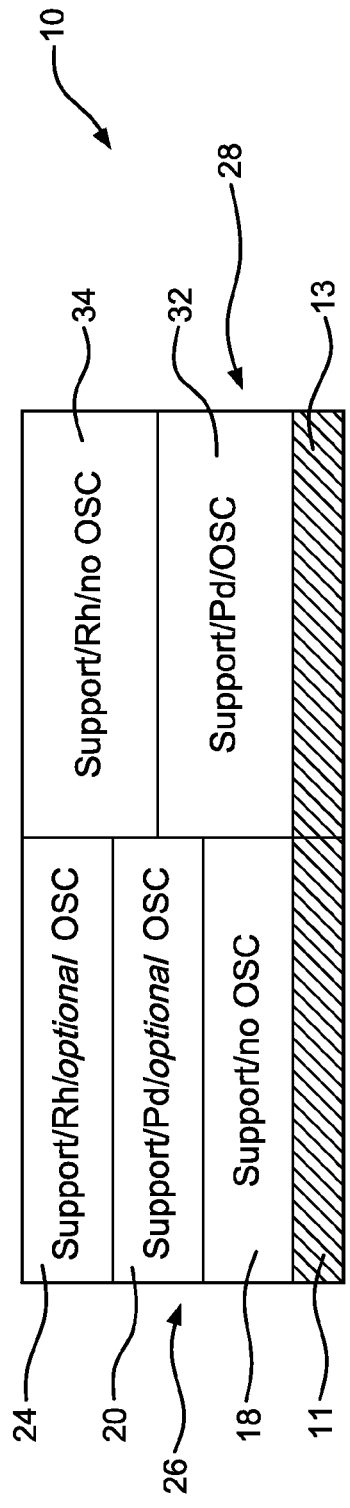

In FIG. 13, a configuration of a catalytic member 10 of an exhaust gas treatment system is shown where an upstream zone having three layers begins at the upstream end 26 and a downstream zone having two layers ends at the downstream end 28, wherein the downstream zone has an OSC in a total amount that is greater than the total amount of OSC(s) in the upstream zone. The zones can abut each other on one or more substrates or can be separated, as desired. In this embodiment, the catalytic member 10 comprises individual substrates 11 and 13, which likewise can be individually housed, or abutted to each other. Alternatively, a single substrate could be used to carry the three layers of the upstream zone and two layers of the downstream zone. Typically the substrates are honeycomb monolith substrates. The upstream zone has an inner layer 18, a middle layer 20, and an outer layer 24. The inner layer 18 comprises a support and is free of OSC and precious metal components and is deposited on the first substrate 11. The middle layer 20 comprises a support, a palladium component, and an optional OSC and is deposited on the inner layer 18. The outer layer 24 comprises a support, a rhodium component, and an optional OSC and is deposited on the middle layer 20.

An inner layer 32 of the downstream zone containing a support, a palladium component, and an OSC is deposited on the second substrate 13. An outer layer 34 of the downstream zone containing a support, a rhodium component, and no OSC is deposited on the inner layer 32. Each of the layers of each of the upstream and downstream zones are formed from different washcoats.

Figure 14:
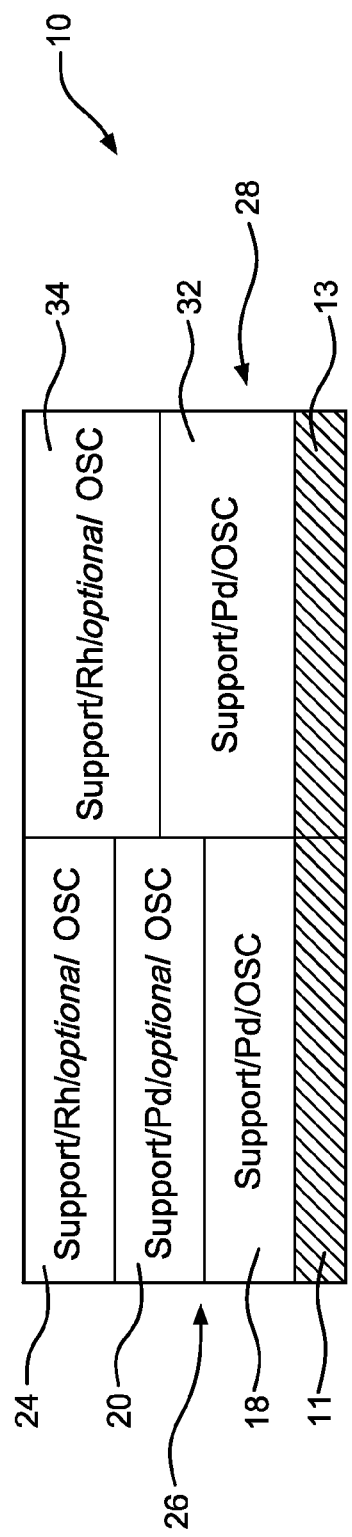

In FIG. 14, a configuration of a catalytic member 10 of an exhaust gas treatment system is shown where an upstream zone having three layers begins at the upstream end 26 and a downstream zone having two layers ends at the downstream end 28, wherein the downstream zone has OSC(s) in a total amount that is greater than the total amount of OSC(s) in the upstream zone. The zones can abut each other on one or more substrates or can be separated, as desired. In this embodiment, the catalytic member 10 comprises individual substrates 11 and 13, which likewise can be individually housed, or abutted to each other. Alternatively, a single substrate could be used to carry the three layers of the upstream zone and two layers of the downstream zone. Typically the substrates are honeycomb monolith substrates. The upstream zone has an inner layer 18, a middle layer 20, and an outer layer 24. The inner layer 18 comprises a support, a palladium component, and an OSC and is deposited on the first substrate 11. The middle layer 20 comprises a support, a palladium component, and an optional OSC and is deposited on the inner layer 18. The outer layer 24 comprises a support, a rhodium component, and an optional OSC and is deposited on the middle layer 20.

An inner layer 32 of the downstream zone containing a support, a palladium component, and an OSC is deposited on the second substrate 13. An outer layer 34 of the downstream zone containing a support, a rhodium component, and an optional OSC is deposited on the inner layer 32. The outer layers of each of the upstream and downstream zones can be formed from the same washcoat. The undercoat layer of the upstream zone and the inner layer of the downstream zone can be formed from the same washcoat.

Figure 15:
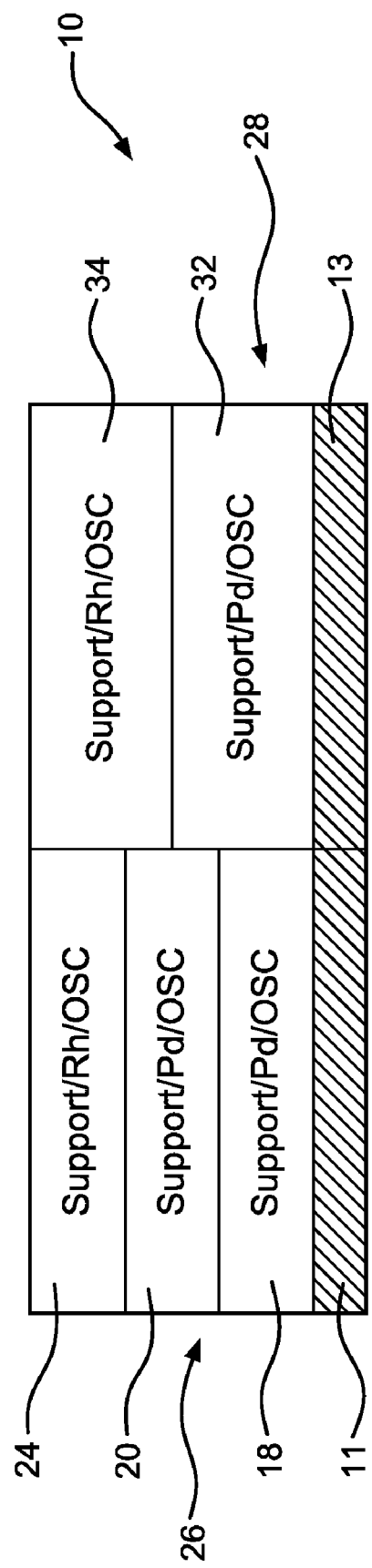

In FIG. 15, a configuration of a catalytic member 10 of an exhaust gas treatment system is shown where an upstream zone having three layers begins at the upstream end 26 and a downstream zone having two layers ends at the downstream end 28, wherein the downstream zone has OSC(s) in a total amount that is greater than the total amount of OSC(s) in the upstream zone. The zones can abut each other on one or more substrates or can be separated, as desired. In this embodiment, the catalytic member 10 comprises individual substrates 11 and 13, which likewise can be individually housed, or abutted to each other. Alternatively, a single substrate could be used to carry the three layers of the upstream zone and two layers of the downstream zone. Typically the substrates are honeycomb monolith substrates. The upstream zone has an inner layer 18, a middle layer 20, and an outer layer 24. The inner layer 18 comprises a support, a palladium component, and an OSC and is deposited on the first substrate 11. The middle layer 20 comprises a support, a palladium component, and an OSC and is deposited on the inner layer 18. The outer layer 24 comprises a support, a rhodium component, and an OSC and is deposited on the middle layer 20.

An inner layer 32 of the downstream zone containing a support, a palladium component, and an OSC is deposited on the second substrate 13. An outer layer 34 of the downstream zone containing a support, a rhodium component, and an OSC is deposited on the inner layer 32. The outer layers of each of the upstream and downstream zones can be formed from the same washcoat. One of the undercoat layer or the inner layer of the upstream zone can be formed from the same washcoat as the inner layer of the downstream zone.

Provided are embodiments where any of the individual upstream zones or the upstream zones in combination are coated for a length of at least 0.5 inches, and up to a length of about 5.0 inches, from the upstream end 26 of the catalytic member 10. The length of coated layers and zones can also be described as a percentage of the length of the catalytic member from the inlet to the outlet. Typically, an upstream zone of triple-layered catalytic material will comprise from about 3% to about 70% of the length of the catalytic member. Also exemplified are upstream zones comprising from about 10% to about 60% and from about 10% to about 50% of the inlet axial length of the catalytic member. An upstream zone of up to about 50% of the length of the catalytic member is also exemplified.

Details of the components of a gas treatment article and system according to embodiments of the invention are provided below.

The Carrier

According to one or more embodiments, the carrier may be any of those materials typically used for preparing TWC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

Preparation of the Layered Catalyst Composite

The layered catalyst composite of the present invention may be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$ per dip. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 500-600° C. for about 1 to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound or palladium and platinum compounds) and at least one finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having a pH of, for example, about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like.

Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The commination may be accomplished in a ball mill or other similar equipment, and the solids content of the slurry may be, e.g., about 20-60 wt. %, more particularly about 30-40 wt. %.

Additional layers, i.e., the second and third layers may be prepared and deposited upon the first layer in the same manner as described above for deposition of the first layer upon the carrier.

Providing coated, multi-zoned catalyst substrates can be done by methods know in the art, for example, as described in U.S. Pat. No. 7,189,376, incorporated herein by reference.

Before describing several exemplary embodiments of the invention, it is to be understood that the invention is not limited to the details of construction or process steps set forth in the following description. The invention is capable of other embodiments and of being practiced in various ways.

EXAMPLES

The following non-limiting examples shall serve to illustrate the various embodiments of the present invention. In each of the examples, the carrier was cordierite.

Example 1

A composite having a catalytic material was prepared using three layers: an inner layer, a middle layer, and an outer layer. In this example, the composition is generally referred to as UC/Pd/Rh (where UC refers to "undercoat"). The layered catalyst composite contained palladium and rhodium with a total precious metal loading of 60 g/ft$^3$ and with a Pt/Pd/Rh ratio of 0/50/10. The substrate had a volume of 1.18 in$^3$, a cell density of 600 cells per square inch, and a wall thickness of about 100 μm. The layers were prepared as follows:

Inner Layer

The components present in the inner layer were high surface area gamma alumina, a ceria-zirconia composite with 28% ceria by weight, strontium oxide, and zirconium oxide, at concentrations of approximately 22.7%, 68.2%, 4.5%, and 4.5%, respectively, based on the calcined weight of the catalyst. The total loading of the inner layer was 1.10 g/in$^3$. The last two components were introduced as colloidal solutions to promote binding. The OSC (oxygen storage component) content in the layer was approximately 19%.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

Middle Layer

The components present in the middle layer were high surface area lanthana-stabilized gamma alumina, a ceria-zirconia composite with 28% ceria by weight, palladium, barium oxide, and strontium oxide, at concentrations of approximately 54.2%, 37.0% 1.4%, 4.9%, and 2.5%, respectively, based on the calcined weight of the catalyst. The last two components were introduced as acetate colloidal solutions to promote binding. The total loading of the middle layer was 2.03 g/in$^3$. The OSC content in the layer was approximately 10%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The components present in the outer layer were high surface area gamma alumina, ceria, rhodium, barium oxide, strontium oxide, and zirconium oxide, at concentrations of approximately 75.5%, 15.1%, 0.35%, 3.0%, 3.0%, and 3.0%, respectively, based on the calcined weight of the catalyst. The last three components were introduced as acetate colloidal solutions to promote binding. The total loading of the outer layer was 1.66 g/in$^3$. The OSC content in the layer was approximately 15% based on the ceria present.

The rhodium in the form of a rhodium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the middle layer using deposition methods known in the art for depositing the catalyst on a cordierite substrate. After coating, the carrier plus the inner, middle, and outer layers were dried, and then calcined at a temperature of 500° C. for about 1 hour.

Example 2

A composite having a catalytic material was prepared using three layers: an inner layer, a middle layer, and an outer layer. In this example, the composition is generally referred to as Pd/MC/Rh. The layered catalyst composite contained palladium and rhodium with a total precious metal loading of 60 g/ft$^3$ and with a Pt/Pd/Rh ratio of 0/50/10. The substrate had a volume of 1.18 in$^3$, a cell density of 600 cells per square inch, and a wall thickness of about 100 μm. The layers were prepared as follows:

Inner Layer

The inner layer had the same composition and slurry preparation as the middle layer of Example 1. The slurry was coated onto the cordierite carrier using deposition methods known in the art for depositing the catalyst on a cordierite substrate. After coating, the carrier plus the inner layer were dried, and then calcined at a temperature of 550° C. for about 1 hour.

Middle Layer

The components present in the middle layer were high surface area gamma alumina, a ceria-zirconia composite with 28% ceria by weight, strontium oxide, zirconium oxide, and a binding component at concentrations of approximately 22.4%, 67.3%, 4.3%, 4.3%, and 1.3%, respectively, based on the calcined weight of the catalyst. The total loading of the inner layer was 1.12 g/in$^3$. The strontium oxide and the zirconium oxide were introduced as acetate colloidal solutions to promote binding. The OSC (oxygen storage component) content in the layer was approximately 19%.

An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried for 1-2 hours at a temperature of 110° C., and then calcined at a temperature of 500° C. for about 1 hour.

Outer Layer

The outer layer had the same composition and slurry preparation as the outer layer of Example 1. The slurry was coated onto the cordierite carrier over the middle layer using deposition methods known in the art for depositing the catalyst on a cordierite substrate. After coating, the carrier plus the inner, middle, and outer layers were dried, and then calcined at a temperature of 550° C. for about 1 hour.

Example 3

Comparative Example

A composite having a catalytic material was prepared using two layers: an inner layer and an outer layer. In this example, the composition is generally referred to as Pd/Rh. The layered catalyst composite contained palladium and rhodium with a total precious metal loading of 60 g/ft$^3$ and with a Pt/Pd/Rh ratio of 0/50/10. The substrate had a volume of 1.18 in$^3$, a cell density of 600 cells per square inch, and a wall thickness of about 100 μm. The composite composition had approximately the same loadings of individual components, e.g., alumina, palladium, rhodium, ceria, as described in Examples 1 and 2. In this comparative example, the layers were prepared as follows:

Inner Layer

The components present in the inner layer were high surface area gamma alumina, a ceria-zirconia composite with 28% ceria by weight, palladium, barium oxide, and strontium oxide, at concentrations of 57.4%, 34.4%, 1.3%, 4.6%, and 2.3%, respectively, based on the calcined weight of the catalyst. The last two components were introduced as acetate colloidal solutions to promote binding. The total loading of the inner layer was 2.18 g/in$^3$. The OSC content in the layer was approximately 9%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried, and then calcined at a temperature of 500° C. for about 1 hour.

Outer Layer

The components present in the outer layer were high surface area gamma alumina, ceria, rhodium, barium oxide, strontium oxide, and zirconium oxide, at concentrations of approximately 71.1%, 17.7%, 0.4%, 3.6%, 3.6%, and 3.6%, respectively, based on the calcined weight of the catalyst. The last three components were introduced as acetate colloidal solutions to promote binding. The total loading of the outer layer was 1.41 g/in$^3$. The OSC content in the layer was approximately 18% based on the ceria present.

The rhodium in the form of a rhodium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and outer layers were dried, and then calcined at a temperature of 500° C. for about 1 hour.

Example 4

Testing

The catalyst composites prepared in Examples 1, 2, and 3 were aged in 10% steam in air at 950° C. for 16 hours under cycling lean-rich conditions. After aging, the composites were evaluated using a laboratory reactor system with various test protocols, including OBD delay time, model lambda transients, and simulated MVEG and FTP drive cycles.

HC/CO/NOx conversions were measured while the temperature was rapidly raised to 500° C. Hydrocarbon, CO, and NOx concentrations were measured using a Fourier Transform Infrared (FTIR) analyzer.

Table 1 shows that the three-layered composites of Examples 1 and 2 show improved conversions of HC, CO, and NOx compared to the two-layered composite of Example 3. Example 1, having an inner layer with no precious metals, performed the best of the three samples for HC, CO, and NOx conversion.

OBD delay time is improved by using the three-layered composites of Examples 1 and 2 compared to the composite of Example 3.

TABLE 1

|  | Residual HC % | Residual CO % | Residual NO$_x$ % |
|---|---|---|---|
| Example 1 | 5.5 | 3.9 | 7.1 |
| Example 2 | 7.0 | 4.0 | 8.2 |
| Example 3 | 14.1 | 6.2 | 16.3 |

Example 5

A composite having a catalytic material was prepared using three layers: an inner layer, a middle layer, and an outer layer. In this example, the composition is generally referred to as UC/Pd/Rh (where UC refers to "undercoat"). The layered catalyst composite contained palladium and rhodium with a total precious metal loading of 42 g/ft$^3$ and with a Pt/Pd/Rh ratio of 0/40/2. The substrate had a volume of 47.3 in$^3$ and a cell density of 400 cells per square inch and with wall thickness around 113 μm. The layers were prepared as follows:

Inner Layer

The components present in the inner layer were high surface area gamma alumina, a ceria-zirconia composite with 28% ceria by weight, zirconium oxide, and a binder, at concentrations of approximately 23.9%, 71.6%, 3.0%, and 1.5%, respectively, based on the calcined weight of the catalyst. The total loading of the inner layer was 1.68 g/in$^3$. The zirconium oxide was introduced as an acetate colloidal solution to promote binding. The OSC (oxygen storage component) content in the layer was approximately 20%.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

Middle Layer

The components present in the middle layer were high surface area lanthana-stabilized gamma alumina, a ceria-zirconia composite with 28% ceria, barium oxide, zirconium oxide, palladium, and a binder at concentrations of approximately 22.2%, 66.7%, 6.7%, 2.2%, 1.0%, and 1.1%, respectively, based on the calcined weight of the catalyst. The barium oxide and zirconium oxide were introduced as acetate colloidal solutions to promote binding. The total loading of the middle layer was 2.25 g/in$^3$. The OSC content in the layer was approximately 19%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The components present in the outer layer were high surface area zirconia-stabilized gamma alumina, a ceria-zirconia composite with 45% by weight ceria content, barium oxide, zirconium oxide, and rhodium, at concentrations of approximately 57.1%, 34.2%, 2.9%, 5.7%, and 0.1%, respectively, based on the calcined weight of the catalyst. The last barium oxide and zirconium oxide were introduced as acetate colloidal solutions to promote binding. The total loading of the outer layer was 0.88 g/in$^3$. The OSC content in the layer was approximately 15%.

The rhodium in the form of a rhodium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the middle layer using deposition methods known in the art for depositing the catalyst on a cordierite substrate. After coating, the carrier plus the inner, middle, and outer layers were dried, and then calcined at a temperature of 500° C. for about 1 hour.

Example 6

A composite having a catalytic material was prepared using three layers: an inner layer, a middle layer, and an outer layer. In this example, the composition is generally referred to as UC/Pd/Rh (where UC refers to "undercoat"). The layered catalyst composite contained palladium and rhodium with a total precious metal loading of 42 g/ft$^3$ and with a Pt/Pd/Rh ratio of 0/40/2. The substrate had a volume of 47.3 in$^3$ and a cell density of 400 cells per square inch and with wall thickness around 113 μm. The layers were prepared as follows:

Inner Layer

The components present in the inner layer were high surface area gamma alumina, a ceria-zirconia composite with 28% ceria by weight, zirconium oxide, and a binder, at concentrations of approximately 23.3%, 69.8%, 4.7%, and 2.3%, respectively, based on the calcined weight of the catalyst. The total loading of the inner layer was 1.08 g/in$^3$. The zirconium oxide was introduced as an acetate colloidal solution to promote binding. The OSC (oxygen storage component) content in the layer was approximately 20%.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

Middle Layer

The components present in the middle layer were high surface area lanthana-stabilized gamma alumina, a ceria-zirconia composite with 28% ceria by weight, barium oxide, and palladium at concentrations of approximately 57.9%, 36.2%, 4.8%, and 1.1%, respectively, based on the calcined weight of the catalyst. The barium oxide was introduced as acetate colloidal solutions to promote binding. The total loading of the middle layer was 2.07 g/in$^3$. The OSC content in the layer was approximately 10%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The outer layer was prepared as described for the outer layer of Example 5.

Example 7

A composite having a catalytic material was prepared using three layers: an inner layer, a middle layer, and an outer layer. In this example, the composition is generally referred to as UC/Pd/Rh (where UC refers to "undercoat"). The layered catalyst composite contained palladium and rhodium with a total precious metal loading of 42 g/ft$^3$ and with a Pt/Pd/Rh ratio of 0/40/2. The substrate had a volume of 47.3 in$^3$ and a cell density of 400 cells per square inch and with wall thickness around 113 μm. The layers were prepared as follows:

Inner Layer

The components present in the inner layer were high surface area gamma alumina, barium oxide, and zirconium oxide, at concentrations of approximately 85.7%, 7.1%, and 7.1%, respectively, based on the calcined weight of the catalyst. The total loading of the inner layer was 1.75 g/in$^3$. The zirconium oxide and barium oxide were introduced as acetate colloidal solutions to promote binding. There was no OSC (oxygen storage component) content in the layer.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

Middle Layer

The middle layer was prepared as described for the middle layer of Example 6.

Outer Layer

The outer layer was prepared as described for the outer layer of Example 5.

Example 8

A composite having a catalytic material was prepared using three layers: an inner layer, a middle layer, and an outer layer. In this example, the composition is generally referred to as UC/Pd/Rh (where UC refers to "undercoat"). The layered catalyst composite contained palladium and rhodium with a total precious metal loading of 42 g/ft$^3$ and with a Pt/Pd/Rh ratio of 0/40/2. The substrate had a volume of 47.3 in$^3$ and a cell density of 400 cells per square inch and with wall thickness around 113 μm. The layers were prepared as follows:

Inner Layer

The inner layer was prepared as described for the inner layer of Example 7.

Middle Layer

The components present in the middle layer were high surface area lanthana-stabilized gamma alumina, high surface area gamma alumina, barium oxide, strontium oxide, zirconium oxide, lanthanum oxide, and palladium at concentrations of approximately 51.2%, 25.6%, 5.5%, 5.5%, 5.5%, 5.5%, and 1.3%, respectively, based on the calcined weight of the catalyst. The strontium oxide and zirconium oxide were introduced as acetate colloidal solutions to promote binding. The barium oxide and lanthanum oxide were introduced as nitrate solutions. The total loading of the middle layer was 1.82 g/in$^3$. There was no OSC in the layer.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The outer layer was prepared as described for the outer layer of Example 5.

Example 9

A composite having a catalytic material was prepared using three layers: an inner layer, a middle layer, and an outer layer. In this example, the composition is generally referred to as UC/Pd/Rh (where UC refers to "undercoat"). The layered catalyst composite contained palladium and rhodium with a total precious metal loading of 42 g/ft$^3$ and with a Pt/Pd/Rh ratio of 0/40/2. The substrate had a volume of 47.3 in$^3$ and a cell density of 400 cells per square inch and with wall thickness around 113 μm. The layers were prepared as follows:

Inner Layer

The components present in the inner layer were high surface area gamma alumina, a ceria-zirconia composite with 28% ceria by weight, zirconium oxide, and a binder at concentrations of approximately 23.5%, 70.6%, 2.9%, and 2.9%, respectively, based on the calcined weight of the catalyst. The total loading of the inner layer was 1.70 g/in$^3$. The zirconium oxide was introduced as an acetate colloidal solution to promote binding. The OSC content in the layer was approximately 20%.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

Middle Layer

The middle layer was prepared as described for the middle layer of Example 8.

Outer Layer

The outer layer was prepared as described for the outer layer of Example 5.

Example 10

Testing

The catalyst composites prepared in Examples 5, 6, 7, 8, and 9 were engine-aged for 40 hours at 875° C. conditions and $T_{bed}$ of 980° C. during the exothermic aging. After aging, the composites were evaluated using a laboratory reactor system with various test protocols, including OBD delay time, model lambda transients, and simulated MVEG and FTP drive cycles.

HC/CO/NO$_x$ conversions were measured while the temperature was rapidly raised to 500° C. Hydrocarbon, CO, and NO$_x$ concentrations were measured using a Fourier Transform Infrared (FTIR) analyzer.

Table 2 depicts residual % HC, CO, NO$_x$ under simulated exhaust conditions for exemplary catalysts. From this data, it can be concluded that the amount of OSC in the top Ph-containing layer has little influence on NOx conversion efficiency. Also, having OSC in the inner layer (e.g., ~25% by weight in the layer) reduces HC efficiency (Examples 5 and 6). Removal of ceria from the inner layer improved hydrocarbon conversion, while keeping good NO$_x$ conversion (Examples 7 and 8). Having some level of OSC in the Pd-containing middle layer improves NO performance (Examples 5, 6, and 7).

TABLE 2

| | Residual HC % | Residual CO % | Residual NO$_x$ % | Delay Time, sec |
|---|---|---|---|---|
| Example 5 | 22.7 | 5.5 | 1.7 | 2 |
| Example 6 | 19.7 | 6.5 | 3.2 | 5.5 |
| Example 7 | 13.6 | 8.0 | 4.8 | 10 |
| Example 8 | 9.9 | 12.1 | 11.7 | 19 |
| Example 9 | 22.3 | 7.9 | 8.1 | — |

Example 11

A zoned catalytic material was prepared having an upstream zone and a downstream zone. Each zone had three layers: an inner layer, a middle layer, and an outer layer. A 2" long carrier was used. The upstream zone, which was approximately 1", was formed of the layered catalytic material of Example 8. The downstream zone, which was approximately 1", was formed of the layered catalytic material of Example 6.

Example 12

A zoned catalytic composite was prepared having an upstream zone and a downstream zone. Each zone had three layers: an inner layer, a middle layer, and an outer layer. A 2" long carrier was used. The upstream zone, which was approximately 1", was formed of the layered catalytic material of Example 7. The downstream zone, which was approximately 1", was formed of the layered catalytic material of Example 6.

Example 13

Testing

The zoned catalyst composites prepared in Examples 11 and 12 were aged for 40 hours at 875° C. conditions and $T_{bed}$ of 980° C. during the exothermic aging. After aging, the composites were evaluated using a laboratory reactor system with various test protocols, including OBD delay time, model lambda transients, and simulated MVEG and FTP drive cycles.

HC/CO/$NO_x$ conversions were measured while the temperature was rapidly raised to 500° C. Hydrocarbon, CO, and $NO_x$ concentrations were measured using a Fourier Transform Infrared (FTIR) analyzer.

Table 3 depicts residual % HC, CO, $NO_x$ under simulated exhaust conditions for exemplary catalysts. The zoned composites of Examples 11 and 12 provide improved ways to optimize HC and $NO_x$ conversion efficiency irrespective of a gas feed composition. Providing a zone having no OSC in the inner layer upstream of a zone having OSC in the inner layer provides an overall system of improved HC performance while sustaining excellent $NO_x$ conversion.

Under lean conditions, therefore, a zone containing OSC in the inner layer enhances $NO_x$ activity without sacrificing HC efficiency. Under rich conditions, on the other hand, a zone containing no OSC in the inner layer enhances HC conversion.

TABLE 3

|  | Residual HC % | Residual CO % | Residual $NO_x$ % |
|---|---|---|---|
| Example 11 | 12.5 | 8.0 | 3.0 |
| Example 12 | 15.5 | 7.5 | 2.5 |
| Example 6 | 19.7 | 7.0 | 3.2 |

Example 14

A three-layered catalytic composite was prepared in accordance with the previous examples. In this example, the composition is generally referred to as UC/Pd/Rh (where UC refers to "undercoat"). The layered catalyst composite contained palladium and rhodium with a total precious metal loading of 30 g/ft$^3$ and with a Pt/Pd/Rh ratio of 0/9/1. The substrate had a volume of 76.75 in$^3$ and a cell density of 600 cells per square inch and with wall thickness around 4 mil (101 μm). The overall OSC content was 1.9 g/in$^3$.

An inner layer located on the substrate having a loading of 1.184 g/in$^3$ comprised a gamma alumina, palladium an OSC (ceria-zirconia composite having 45% ceria), stabilizers including an alkaline earth metal and a lanthanide, zirconia oxide, and a binder. The OSC was present in an amount of 0.9 g/in$^3$.

A middle layer located on the inner layer having a loading of 1.385 g/in$^3$ comprised a gamma alumina, palladium an OSC (ceria-zirconia composite having 40% ceria), and stabilizers including an alkaline earth metal and a lanthanide. The OSC was present in an amount of 0.75 g/in$^3$.

An outer layer located on the middle layer having a loading of 0.932 g/in$^3$ comprised a lanthana-stabilized gamma alumina, rhodium, an OSC (ceria-zirconia composite having 45% ceria), an alkaline earth metal stabilizer, zirconia oxide, and a binder. The OSC was present in an amount of 0.25 g/in$^3$.

Example 15

A two-layered catalytic composite was prepared in accordance with the previous examples. In this example, the composition is generally referred to as UC/Pd/Rh (where UC refers to "undercoat"). The layered catalyst composite contained palladium and rhodium with a total precious metal loading of 30 g/ft$^3$ and with a Pt/Pd/Rh ratio of 0/9/1. The substrate had a volume of 76.75 in$^3$ and a cell density of 600 cells per square inch and with wall thickness around 4 mil (101 μm). The overall OSC content was 1.7 g/in$^3$.

An inner layer located on the substrate having a loading of 2.116 g/in$^3$ comprised a gamma alumina, palladium an OSC (ceria-zirconia composite having 40% ceria), stabilizers including an alkaline earth metal and a lanthanide, zirconia oxide, and a binder. The OSC was present in an amount of 1.450 g/in$^3$.

An outer layer located on the inner layer having a loading of 1.607 g/in$^3$ comprised a lanthana-stabilized gamma alumina, rhodium, an OSC (ceria-zirconia composite having 45% ceria), an alkaline earth metal stabilizer, zirconia oxide, and a binder. The OSC was present in an amount of 0.25 g/in$^3$.

Example 16

A three-layered catalytic composite was prepared in accordance with the previous examples. In this example, the composition is generally referred to as UC/Pd/Rh (where UC refers to "undercoat"). The layered catalyst composite contained palladium and rhodium with a total precious metal loading of 30 g/ft$^3$ and with a Pt/Pd/Rh ratio of 0/9/1. The substrate had a volume of 76.75 in$^3$ and a cell density of 600 cells per square inch and with wall thickness around 4 mil (101 μm). The overall OSC content was 1.3 g/in$^3$.

An inner layer located on the substrate was prepared as described for Example 14.

A middle layer located on the inner layer having a loading of 1.355 g/in$^3$ comprised a gamma alumina, palladium an OSC (ceria-zirconia composite having 40% ceria), and stabilizers including an alkaline earth metal and a lanthanide. The OSC was present in an amount of 0.15 g/in$^3$.

An outer layer located on the middle layer was prepared as described for Example 14.

Example 17

A zoned catalytic composite is prepared having an upstream zone and a downstream zone each located on a different substrate. Each zone has three layers: an inner layer, a middle layer, and an outer layer. The inner layers of both zones are formed from the same washcoat. The outer layers of both zones are formed from the same washcoat. The upstream zone is formed of the layered catalytic material of Example 16. The downstream zone is formed of the layered catalytic material of Example 14.

Example 18

A zoned catalytic composite is prepared having an upstream zone and a downstream zone each located on a different substrate. Each zone has three layers: an inner layer, a middle layer, and an outer layer. The outer layers of both zones are formed from the same washcoat. The upstream zone is formed of the layered catalytic material of Example 16. The downstream zone is formed of the layered catalytic material of Example 6.

Example 19

A zoned catalytic composite is prepared having an upstream zone and a downstream zone each located on a different substrate. The upstream zone has three layers: an inner layer, a middle layer, and an outer layer. The downstream zone has two layers: an inner layer and an outer layer. The upstream zone is formed of the layered catalytic material of Example 16. The downstream zone is formed of the layered catalytic material of Example 15.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An exhaust gas treatment system comprising:
   a catalytic material having the capability of simultaneously catalyzing the oxidation of hydrocarbons and carbon monoxide and the reduction of nitrogen oxides and having an upstream zone and a downstream zone deposited on a carrier;
   wherein in the upstream zone, the catalytic material comprises:
     an inner layer on the carrier, the inner layer comprising a support and a palladium component;
     an outer layer above the inner layer, the outer layer comprising a support and a rhodium component; and
     a first oxygen storage component located in the inner layer, the outer layer, or both;
   wherein in the downstream zone, the catalytic material comprises:
     an inner layer on the carrier, the inner layer comprising a support and a palladium component;
     an outer layer above the inner layer, the outer layer comprising a support and a rhodium component; and
     a second oxygen storage component located in the inner layer, the outer layer, or both such that the second oxygen storage component is present in an amount that is greater than the amount of the first oxygen storage component.

2. The exhaust gas treatment system of claim 1, wherein the carrier comprises a first substrate the upstream zone and a second substrate such that the upstream zone is located on the first substrate and the downstream zone is located in the second substrate.

3. The exhaust gas treatment system of claim 1, wherein the upstream zone further comprises a middle layer located above the inner layer and below the outer layer, the middle layer comprising a support and an optional palladium component and an optional third oxygen storage component.

4. The exhaust gas treatment system of claim 1, wherein the downstream zone further comprises a middle layer located above the inner layer and below the outer layer, the middle layer comprising a support and an optional palladium component and an optional third oxygen storage component.

5. The exhaust gas treatment system of claim 1, wherein the first oxygen storage component is present in an amount in the range of 0.1 to 1.5 $g/in^3$ and the second oxygen storage component is present in an amount in the range of 1.55 to 2.0 $g/in^3$.

6. The exhaust gas treatment system of claim 1, wherein the outer layer of both the upstream zone and the downstream zone comprise the same composition.

7. The exhaust gas treatment system of claim 1, wherein the inner layer of both the upstream zone and the downstream zone comprise the same composition.

8. The exhaust gas treatment system of claim 1, wherein both the upstream and downstream zones each further comprises a middle layer located above the inner layer and below the outer layer, the middle layers each independently comprise a support, a palladium component, and a third oxygen storage component.

9. The exhaust gas treatment system of claim 1, wherein both the upstream and downstream zones each further comprises a middle layer located above the inner layer and below the outer layer, the inner layers of both the upstream and downstream zones each comprising the same composition.

10. The exhaust gas treatment system of claim 1, wherein the upstream zone extends for no more than 50% of the substrate's length.

11. The exhaust gas treatment system of claim 1, wherein the downstream zone extends for no more than 50% of the substrate's length.

12. The exhaust gas treatment system of claim 1, wherein the inner layer, the outer layer, or combinations thereof further independently comprise platinum, palladium, rhodium, or combinations thereof.

13. The exhaust gas treatment system of claim 1, wherein the inner and outer layers and of both the upstream and downstream zones are independently supported by an activated compound selected from the group consisting of alumina, silica-alumina, alumino-silicates, alumina-zirconia, and alumina-ceria.

14. A method for oxidizing hydrocarbons and carbon monoxide and reducing nitrogen oxides comprising:
    contacting a gaseous stream comprising the hydrocarbons, carbon monoxide, and nitrogen oxides with the exhaust gas treatment system of claim 1.

15. The method of claim 14, wherein the carrier comprises a first substrate the upstream zone and a second substrate such that the upstream zone is located on the first substrate and the downstream zone is located in the second substrate.

* * * * *